(12) United States Patent
Yazykov

(10) Patent No.: US 9,675,911 B2
(45) Date of Patent: Jun. 13, 2017

(54) WATER INTAKE FILTER

(71) Applicant: Andrey Yurievich Yazykov, Moscow (RU)

(72) Inventor: Andrey Yurievich Yazykov, Moscow (RU)

( * ) Notice: Subject to any disclaimer, the term of this patent is extended or adjusted under 35 U.S.C. 154(b) by 282 days.

(21) Appl. No.: 14/418,168

(22) PCT Filed: Jul. 26, 2013

(86) PCT No.: PCT/RU2013/000642
§ 371 (c)(1),
(2) Date: Jan. 29, 2015

(87) PCT Pub. No.: WO2014/021740
PCT Pub. Date: Feb. 6, 2014

(65) Prior Publication Data
US 2015/0209697 A1     Jul. 30, 2015

(30) Foreign Application Priority Data
Aug. 1, 2012   (RU) ................... 2012132901

(51) Int. Cl.
*B01D 35/02*    (2006.01)
*B01D 29/11*    (2006.01)
*F04B 53/20*    (2006.01)

(52) U.S. Cl.
CPC ............ *B01D 29/114* (2013.01); *B01D 35/02* (2013.01); *F04B 53/20* (2013.01); *B01D 2201/02* (2013.01)

(58) Field of Classification Search
None
See application file for complete search history.

(56) References Cited

U.S. PATENT DOCUMENTS

| 6,416,661 B1 | 7/2002 | Cordry |
| 2010/0078395 A1* | 4/2010 | Shevitz ................. B01D 29/111 210/808 |

FOREIGN PATENT DOCUMENTS

| RU | 2402675 C2 | 10/2010 |
| SU | 962486 A1  | 9/1982 |
| SU | 1057638 A  | 11/1983 |

\* cited by examiner

*Primary Examiner* — Chester Barry
(74) *Attorney, Agent, or Firm* — Nadya Reingand; Yan Hankin

(57) ABSTRACT

The filter comprises a case and a removing cap mechanically connected by vertical uprights as well as cylindrical filtering net placed between the case and the cap. The case is made as a truncated perforated hollow cone, and a non square full slot along its big bass periphery. The slot forms a continuous contour to place the filtering net end. The uprights are attached to the cap by a set of screws. This version makes the filter durable, reliable and repairable.

6 Claims, 5 Drawing Sheets

WATER INTAKE FILTER

REFERENCE TO RELATED APPLICATIONS

Figure 1:
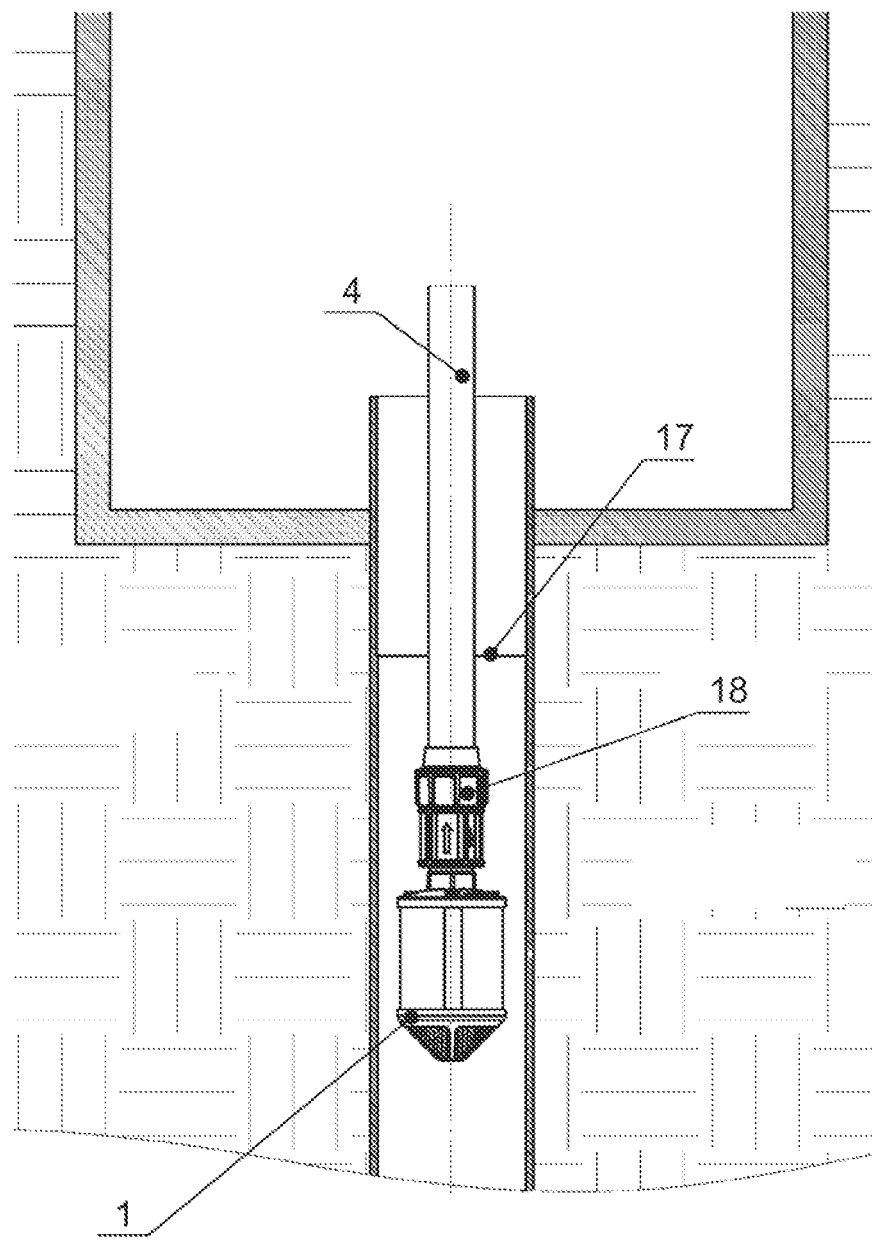

This patent application is a National stage application of the PCT application PCT/RU2013/000642 filed on Jul. 26, 2013 which claims priority to Russian application RU2012132901 filed Aug. 1, 2012, currently issued as a patent.

FIELD OF THE INVENTION

This invention applies to hydro mechanical engineering and, namely, to filters that may be used as water intake of main line pumps. The main destination of this filter is to protect the absorbing main line and the superficial pump from coarse mechanical impurities.

PRIOR ART

There is a filter that includes case, inlet mid outlet fittings, filter element, installed with the ability to move lengthwise, firings made as cone and fixed to pivot from different sides of inlet and outlet fittings. The filter element together with the firings functions as thread switch and back-seating valve. (SU No. 1699523).

There is a hole filter that contains castellated pipe with nipple and screwed parts concentric to which a filter element made of rings with adjoining ends is installed. In one or both ends of the rings there is a knurling tool made crosswise or tangentially to improve the carrying capacity of the filter, (RU No. 2364709).

The hole filter includes a filtering cover with base element as a tube, side members as pivots and pressure rings made with external slots for side-members and internal slots that form side channels with the base element. Side elements are made from pivots as right-angled triangle whose legs form the external diameter of the filter cover and acute angles are established in galleries forming one-side expansion and providing directed flows of the filtered agent (RU No. 2284408).

There is a mine filter that includes a case containing cylindrical part with tangential socket to receive water, a cover with the socket to remove refined water and a conical part with a valve to wash the filter through. It is installed on top of the conical part and equipped with congruent filtering element with an internal cavity installed coaxially inside the ease forming a circular spacing that diminishes in the direction of the conical pan of the case top. The valve to remove purified water is connected with, the internal cavity of die filtering element. (RU No. 37386).

There is a hole filter that includes a key case and a filtering cover installed concentrically. The cover contains at least one coating of drainage network, two coatings of filtering networks and external protective net jacket witch is equal to the derange one. In this case a framing formed by steal pivots of circular section is used as a reference case for filtering cover. One of them has a slot of radial profile until the pivot center meant for fixing filtering cover nets. The pivots are fixed and welded according to direct-contact outlines to two supporting steel cylinders with nipple ends to coupling and to supporting steel rings made of stick of circular section with bends to install pivots. Above pivot nets of filtering cover are winded forming overlaps of the nets ends symmetrically to the pivot with the radial slot. Then the filtering cover is welded to the supporting case. (RU No. 2433251).

There is a screen filter that includes a tubular net and a supporting case as a spring, the sleeve net as fixed by one end on the flanged branch and by the other on the bush of the intake dismantling director cone by wire though holes made in the said branch and bush, it is installed on the supporting case made as a spring that ensures filter installation into the channel with bent axis of internal cylindrical surfaces. The horse-shaped net is made of the cloth with overlap and sewed by clips with a step equal to the step of a spring. The entering dismantling director cone has two parts and is equipped with, a thread between the director cone and the bush where previously a tubular net was fixed. (RU No. 2359738, prototype).

Weak points of those well-known filters reside in the complexity of filter parts connection, poor reparability, week pinup protection because of high proper sensibility to impurities. The technical message of the useful invention is to create an effective water intake filter and to broaden, water intake filters quantity.

SUMMARY OF THE INVENTIONS

The technical result that ensures the task performance resides in simplifying joints construction and improving reparability—technology of placing and changing nets for washing cases and sets as well as for increasing work reliability by means of expanding useful filtering surface and operation life until the next filter washing.

The useful invention essence resides in the following: the filter has a ease and a removing tap mechanically connected by threading elements as well as a cylindrical filtering net placed between the case and the tap. The case is made by the side of absorption as a perforated hollow cone, along its big base periphery a non square full slot for a net end is made. It has a bow-shaped wall with a rectilinear slot from the external side to place longitudinal net ends and uprights with butt mounting holes for the said thread elements. The cap is made as an in-line connecting pipe with an outlet port to supply liquid for flange and pump absorption. Along its periphery a non square slot is made to place another net end with passage openings to install threading elements in the upright, holes of the case.

Its preferable that the ease and the cap are made of plastic, the net is made of steel, the hollow ship cone is equipped with webbing and divided by them in four sectors perforated by round holes, the uprights performed together with the webbings, one of the uprights made together with the bow-shaped wall, the mounting holes in the case uprights for threading elements are made as blind ones.

SHORT DESCRIPTION OF DRAWINGS

Figure 2:
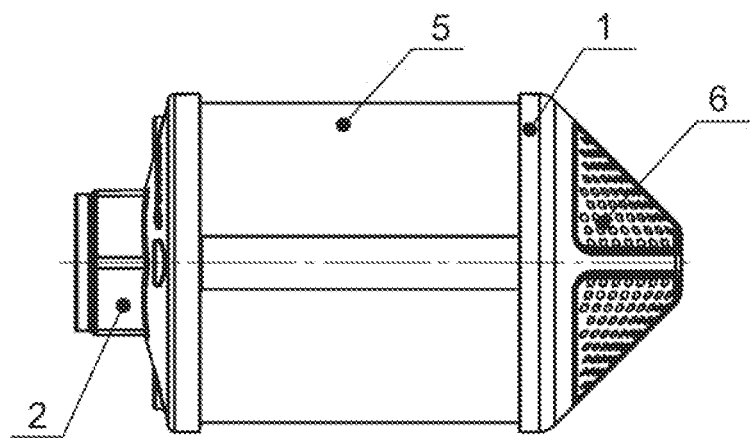
Figure 3:
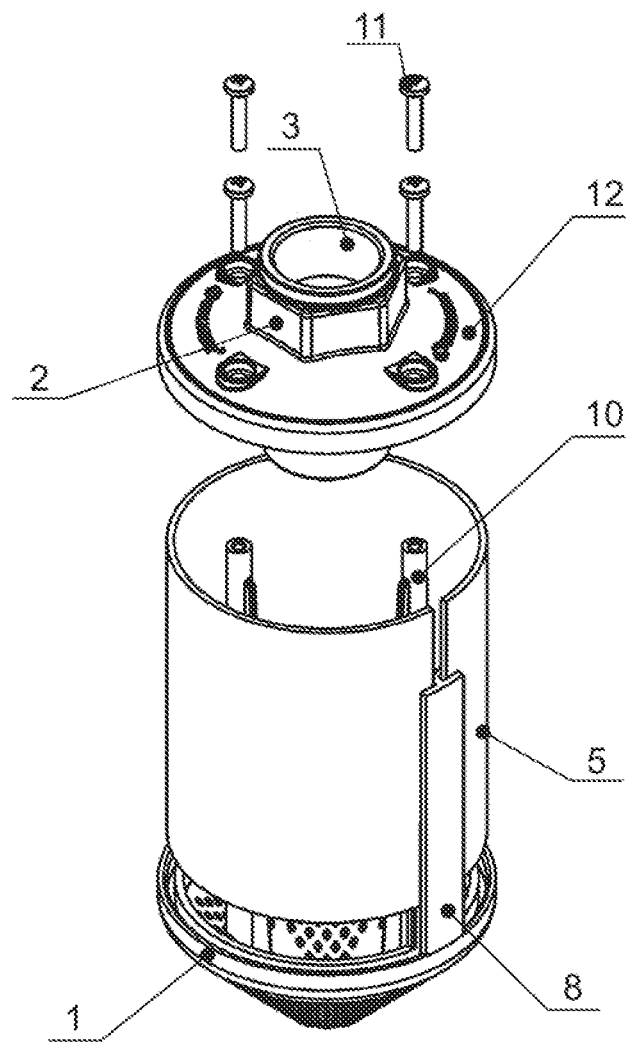
Figure 4:
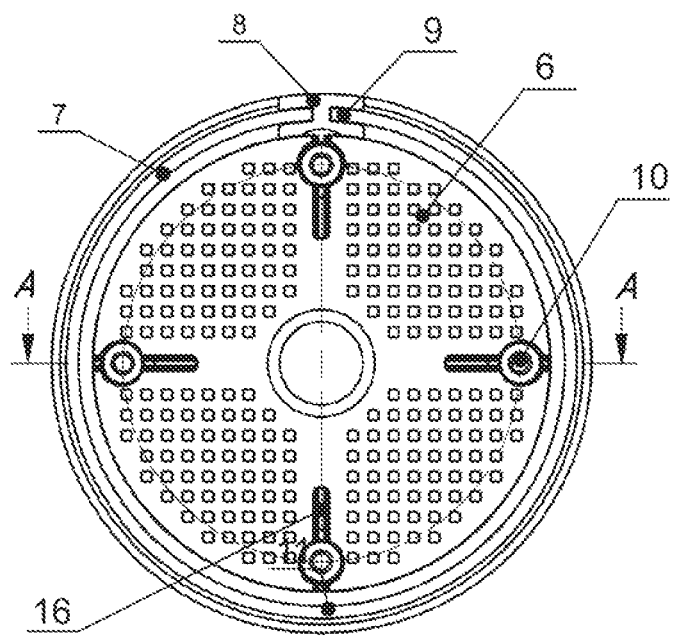
Figure 5:
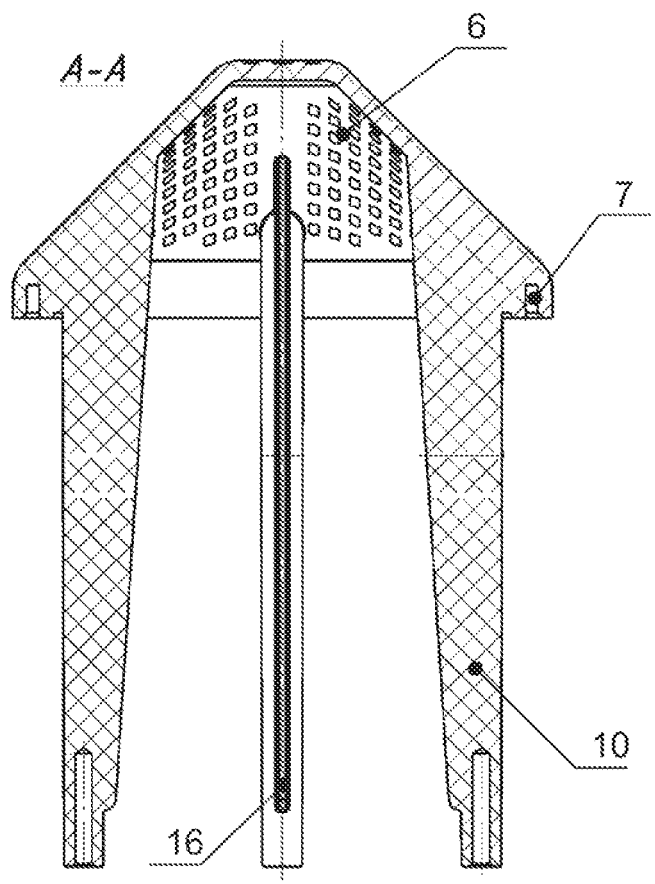
Figure 6:
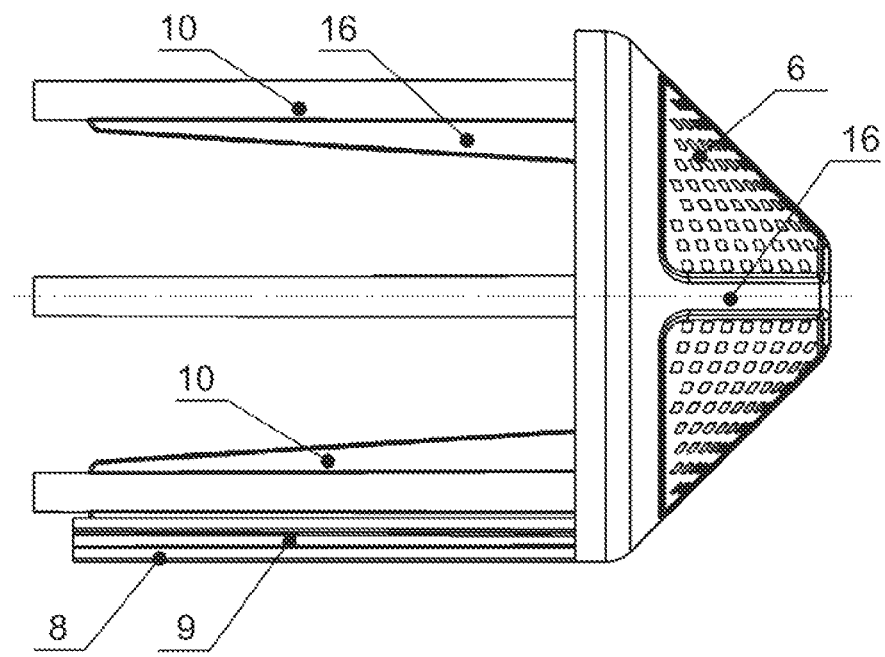
Figure 7:
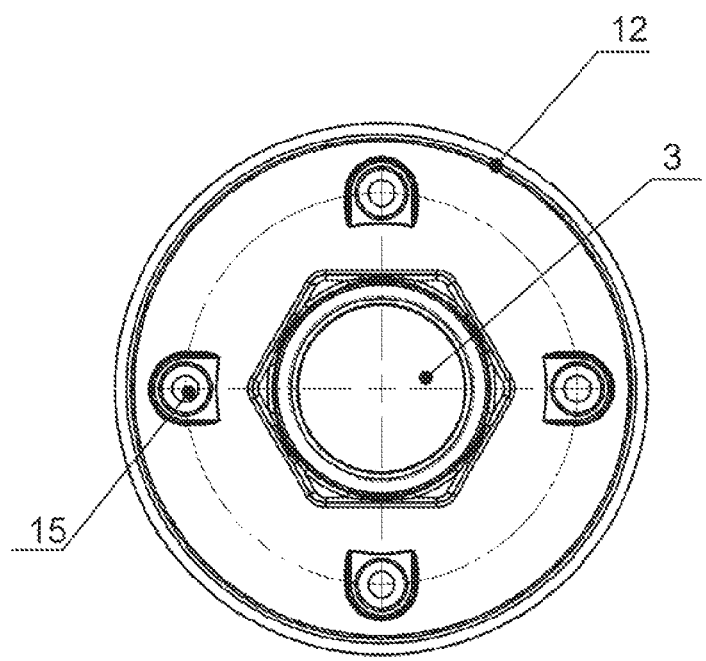
Figure 8:
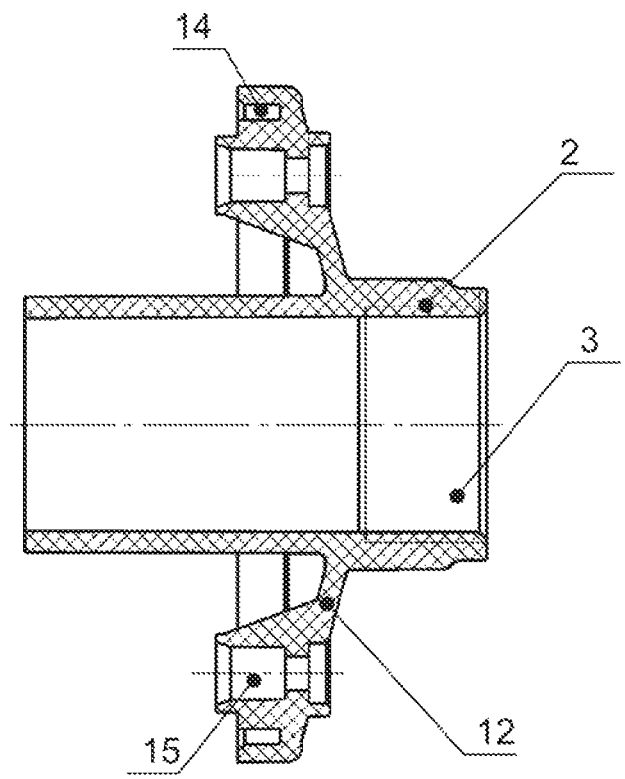
Figure 9:
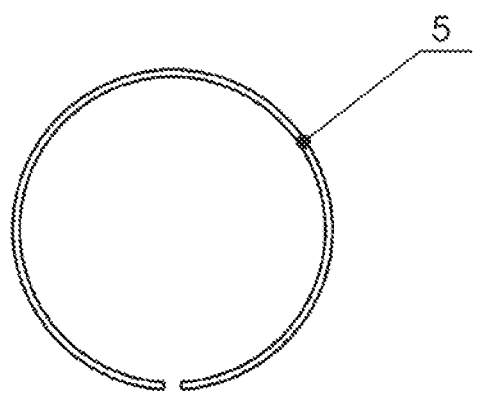

In FIG. 1 the installation diagram of suction line water intake filter of superficial pump or automatic pump station "Djambo" is shown, in FIG. 2—filter ready-assembled, in FIG. 3—filter according to FIG. 1 with the removed and displaced cap. In FIG. 4—view of the cone of the filter case from the inside, in FIG. 5—the A-A section of FIG. 4, in FIG. 6—lateral view of the case, in FIG. 7—the filter cap, in FIG. 8—the A-A section of FIG. 8, in FIG. 9—the filter net.

The filler contains mechanically connected case 1 and removing cap 2 made with the outlet central passage 3 to supply water into the central line 4 for pump absorption (not shown), cylindrical filtering net 5, placed between case 1 and cap 2. The ease 1 is made from, the side of suction as a truncated perforated hollow cone 6 along whose big base periphery a non square full slot 7 for a net end 5 is made, and with short bow-shaped wall S with two parallel rectilinear slots 9 from the internal part for axial net ends 5 and with the uprights 10, that have end mounting holes for thread elements 11. The cap 3 is made as an in-line connecting pipe (not shown) with a reach-through, cylindrical hole 3 and a flange 12 placed around this connecting pipe. Along the periphery of the latter a non square full slot 14 for placing another net end 5 is made, with passage openings 15 for placing threading elements (screws) 11 into the holes of uprights 10 of the case 1. The slots 7,9,14 form the continuous contour to place net ends 5 along the entire perimeter.

Case 1 and cap 2 are made of plastic and net 5 is made of steel in section, rectangular, in spread state.

The hollow cone 6 of case 1 is shown divided by webbing 16 into four sectors perforated by round holes.

The uprights 10 are made together with webbing 16.

One of the uprights 10 can be performed together with bow-shaped wall 8 situated where slot 7 ceased.

Mounting holes in uprights 10 of case 1 for threading elements 11 are made as blind ones.

In the filter exit section back pressure valve 18 is installed to supply liquid for pump absorption (not shown) into main line 4.

DETAILED DESCRIPTION OF THE INVENTION

Preferred Embodiment

The intake filter is operated as follows:

Into the slots 7,9,14 net ends 5 are placed and through the holes 15 threading elements 11 are screwed into the holes of uprights 10 of case 1. This ensures the filter assembling and net 5 cylindrical form fixation.

By means of cap 2 connecting pipe the filter is linked op with back pressure valve 18 (port size—1 inch) of absorbing main line 4 of superficial pump or the automatic pump station "Djambo". The filter and back pressure valve 18 are situated below the level (mirror) 17 of water.

During the pump performance the liquid is absorbed trough perforation holes of cone 6 and net holes 5. The conical shape (cone 6) of case 1 inferior part allows to use as much as possible the suction area even if the back pressure valve 18 with the net was placed to the well bottom during the unskilled main line assembling.

The eduction net 5 area of the filter is many times bigger then the classical construction. That allows the pump to pump water adequately even in case of partial rose 5 blockage without losing its characteristics and submitting the pump's engine to overwork.

In case of blockage the filter is washed through properly. For this purpose screws 11 are screwed quickly from uprights 10, cap 2 and case 1 are separated and net 5 is taken manually to be washed through.

As the filtered net 5 is fixed dismantled on four screws 11 (instead of classical insertion) this allows to disassemble the filter and to clean (or substitute) it which increases the equipment usage period and improves reparability.

The referred features make the said simple construction of the filter more reliable, lasting and repairable.

INDUSTRIAL APPLICATIONS

The present invention is embodied with multipurpose equipment extensively employed by the industry.

What is claimed is:

1. A filter, comprising:
   a case,
   a removable cap connected by means of uprights, and
   a cylindrical filtering net placed between the case and the cap;
   wherein the case is made as a truncated perforated hollow cone,
   wherein along a base periphery of the cone a non square full slot for placing an end of the filtering net is made;
   wherein the uprights have butt mounting holes for inserting one or more threading elements;
   wherein the cap is made as an in-line connecting pipe with an outlet port; and
   wherein the uprights are connected to the cap via the mounting holes.

2. The filter according to claim 1, wherein the case and the cap comprise plastic and the net comprises steel.

3. The filter according to claim 1, wherein the hollow case cone is divided into four sectors, each sector being perforated by round holes, the perforated sectors being connected by a webbing.

4. The filter according to claim 3, wherein the uprights are made together with the webbing as one piece.

5. The filter according to claim 3, wherein the uprights are made together with a bow-shaped wall for connecting ends of the slot.

6. The filter according to claim 1, wherein the butt mounting holes are blind holes.

* * * * *